Jan. 27, 1931.  I. HECHENBLEIKNER  1,790,502
PROCESS OF MANUFACTURING MONOPHOSPHATES OF
ALKALI METALS AND ALKALINE EARTHS
Filed July 1, 1927
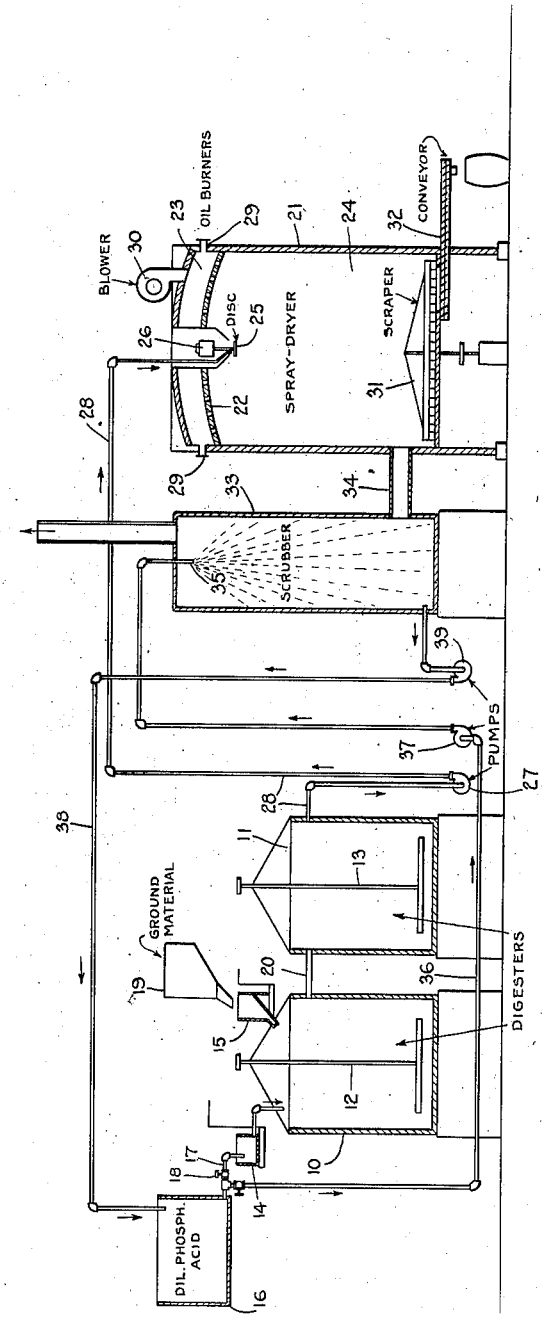
INVENTOR
I. Hechenbleikner
BY
ATTORNEYS Patented Jan. 27, 1931

1,790,502

UNITED STATES PATENT OFFICE

INGENUIN HECHENBLEIKNER, OF CHARLOTTE, NORTH CAROLINA, ASSIGNOR, BY MESNE ASSIGNMENTS, TO CHEMICAL CONSTRUCTION CORPORATION, A CORPORATION OF DELAWARE

PROCESS OF MANUFACTURING MONOPHOSPHATES OF ALKALI METALS AND ALKALINE EARTHS

Application filed July 1, 1927. Serial No. 202,822.

This invention relates to the manufacture of alkali phosphates and more particularly to a process for manufacturing mono-phosphates of alkali metals and alkaline earths.

The methods heretofore employed for manufacturing mono-phosphates, such as double superphosphate with approximately 44% $P_2O_5$ and similar products have been based upon reacting a concentrated phosphoric acid (of 50° to 56° Bé.) with ground raw material such as calcium phosphate (phosphate rock), lime, sodium salts, etc., depending upon the kind of alkali phosphate desired to be produced. One of the preferred methods utilizing this reaction as heretofore practised consists in treating the ground alkali reagent or material with the concentrated phosphoric acid in specially designed mixers and in allowing the reagents to react in a den or on a storage pile for an extended period of time, after which the products of the reaction are dried and then reground.

The production of mono-phosphates in accordance with these prior methods is attended with a number of objections and difficulties. The reaction of the raw alkaline material with concentrated phosphoric acid does not produce the optimum intimate contact between the ground material and the acid, the mixture obtained in the reaction being too solid, with the result that the conversion or reaction is not carried out to its maximum possibilities and so the finished product contains a substantial amount of insoluble $P_2O_5$. To produce a fairly high yield, the reagents are allowed to "cure" or react in the den, this step of the process consuming a substantial and objectionable period of time. After the reaction has proceeded for the time required, the drying of the products of the reaction takes place, and this is carried out usually in a series of steps in rotary dryers, necessitating the provision of a number of pieces of apparatus, which at best is operated inefficiently due to the substantial heat loss involved. After the drying step, the resulting product has to be comminuted or reground before it can be marketed.

The prime object of my present invention centers about the provision of a process for manufacturing mono-phosphates of alkali metals and alkaline earths in which the difficulties and objections inherent in and encountered in the practice of these prior methods are effectively obviated and eliminated. I have discovered that the mono-phosphate resulting product may be obtained in powdered form without the necessity of comminuting or regrinding the dried products of reaction, and that the same may be produced under optimum reacting conditions and at high heat efficiencies by first mixing the ground raw material with a dilute phosphoric acid and in then evaporating the mixture or products of reaction in an atomizing or spray drying machine where the evaporation takes place practically instantly under the influence of hot combustion gases, the resulting product being a dry powdered phosphate ready for commerce. The prime desideratum of my present invention therefore is directed to the provision of this process and the process steps utilized therein.

In the preferred practice of this process, the weak phosphoric acid as obtained for instance from a standard Dorr thickener (the acid being generally of the strength of from 25°–30° Bé.) is mixed in correct proportions with the ground raw material such as phosphate rock (calcium phosphate) oyster shell, sodium salts, etc. and the reacted mixture or products of reaction is or are then evaporated in an atomizing or spray drying machine where drying or evaporation is carried on by hot gases produced in any known manner. Also, in practising the process in the preferred manner, the dust formed or produced in the spray drying machine carried by the waste gases is scrubbed in a scrubbing system by means of a solution spray used in some step in the process, said solution being taken, for example, from the dilute phosphoric acid employed in the first reaction step, the product of said scrubbing system being circulated in the process by returning the same for use in the reaction step of the process. When the manufacturing process is carried out in this preferred manner, not only is there produced a maximum reaction yield, but the process is characterized by a high heat efficiency, simplicity of operation and an adaptability to the use of simple apparatus capable of being operated at a low cost of installation and operating upkeep.

To the accomplishment of the foregoing and such other objects as will hereinafter appear, my invention consists in the process, the steps thereof and their relation one to the other as hereinafter more particularly described and sought to be defined in the claims, reference being had to the accompanying drawing which shows a preferred embodiment of my invention, and in which The figure is a diagrammatic layout or "flow sheet" of a simple plant showing the practice of the method of my invention.

In the first step of the process, the alkali metal or alkaline earth is reacted with the phosphoric acid obtained from the first Dorr thickener (of the strength of 25°–30° Bé.), the alkali material or reagent being first ground and then mixed in the desired proportion with a weak or dilute phosphoric acid. The alkali reagent may be calcium phosphate, lime, sodium salts, etc. depending upon the material desired to be made. This step of the process is carried out preferably in special digesters or agitators 10 and 11 equipped with mixers or stirrers 12 and 13 respectively, the first digester 10 receiving the reacting ingredients from a receptacle 14 containing phosphoric acid and a hopper 15 containing the ground raw material, both receptacle and hopper forming part of weighing apparatus, the said receptacle 14 receiving its phosphoric acid supply from a tank 16 and connecting pipe 17 controlled by a valve 18, and the hopper 15 receiving its supply from a supplying bin 19 containing the ground alkali material. The reaction products in the digester 10 flow into the digester 11 through the communicating duct 20 for further reaction, and the reaction products obtained in the digester 11 are used in the next step of the process.

I have found that by thus mixing the ground material with the weak or dilute phosphoric acid, I obtain a more intimate contact between the ground material and the acid than is the case when the reacting mixture is made with a strong or concentrated acid. Where a strong acid is used the mixture is nearly solid, while where a weak acid is employed, the resulting reacting mixture is a liquid with suspended materials or particles. The more intimate reaction occurring with the weak phosphoric acid results in a higher conversion, so that the finished product contains less insoluble $P_2O_5$.

The second step of the process consists in evaporating or drying the reaction products obtained in the digesting chambers in a spray dryer of suitable design, as for example, a Krause dryer, similar to those used for drying of milk, where evaporation is carried on by hot gases produced in any known manner. Preferably I employ for this purpose an atomizing or spray drying machine generally designated as 21 having a construction more particularly described and claimed in my copending application to combined spray dryer and burner, Serial No. 192,463, filed May 18, 1927. This spray drying machine comprises an enclosure subdivided by an orificed partition 22 into a combustion chamber 23 and a drying chamber 24, said spray drying machine being provided with a centrifugal spray drying device 25 operated at high speed by a motor 26. The spray drying device 25 embodies preferably a disc construction such as is set forth in my copending application to atomizing apparatus, Serial No. 192,464, filed May 18, 1927. The reacting products obtained from the digesting tank 11 are fed by means of a pump 27 through the feed line 28 into the disc or other spraying device 25, where the reacting products in the form of a liquid with finely suspended particles is sprayed out in a very thin film which is subjected to hot gases coming through the orificed partition 22 and from the combustion chamber 23, said gases being produced for example by means of a series of oil burners 29, 29 arranged circumferentially about the combustion chamber 23. A blower 30 is associated with the spray drying apparatus 21 and serves to supply the necessary amount of air which enters the combustion chamber 23, the said blower 30 being also utilized in association with the oil burners 29, as more particularly described in my aforesaid application, Serial No. 192,463. The hot air or gas used for this evaporating step can be supplied at any suitable temperature, for instance, as high as 400° to 600° C. and the evaporation takes place practically instantly so that a dry powder of mono-phosphate material is obtained. The powdered phosphate thus obtained is removed from the spray drying machine 21 by means of a rotary scraper 31 which feeds the material to a screw conveyor 32.

In the practice of this concentrating step of the process, the heat requirements are reduced to a minimum since all of the concentration is made in one step with an efficiency just as high as that of an acid concentrator or vacuum evaporator. The drying in rotary dryers as practised in prior processes is less efficient, and as such prior process is carried out in a series of steps, there results a substantial heat loss. Furthermore, by the use of this concentrating step of the process, I am enabled to eliminate the mixing, the curing in dens and the drying in rotary dryers of prior processes, and all of the difficulties and objections inherent therein and resulting therefrom.

For reclaiming any of the dust carried by the waste gases produced in the spray dryer 21, I prefer to provide a scrubbing system comprising a packed tower or a spray tower over which some liquid used in the process is sprayed. This scrubbing tower is shown in the drawings in the form of a spray tower 33 communicating by means of a passage 34 with the drying chamber 24. The waste gases from the drying chamber 24 and flowing through the passage 34 in the direction indicated by the arrow in the drawing, carry some of the phosphate dust into the scrubbing tower 33; and through this scrubbing tower is sprayed as indicated at 35 a liquid used in the process, which for example may be a dilute phosphoric acid obtained from the tank 16 and fed from the tank 16 through the communicating piping 36, the said acid being forced to the top of the scrubbing tower by means of a pump 37. The products of this scrubbing tower are returned to the acid tank 16 by means of the ducts or piping 38, 38 which communicatingly interconnect the bottom of the scrubbing tower 33 with the top of the phosphate acid tank 16, a pump 39 being provided in this communicating means. While I have shown the liquid for the scrubbing tower as taken from the acid tank 16, it will be understood that the same may be taken from the digesting system, as for example, from the digester 11. In any case, the phosphate dust will be reclaimed or salvaged. The scrubbing tower also acts as a preheater and thereby serves to increase the heat efficiency.

The method of practising the process and operating the apparatus therefor and the many advantages thereof will, in the main, be fully apparent from the above detailed description thereof. In addition to obtaining a high conversion of the reacting products and an evaporation or drying of the products of reaction at high efficiency with the elimination of regrinding and difficult drying steps, the process is characterized by a simplicity of operation, rendering the same independent of skilled help or assistants or of a large number of unskilled hands, the steps of the process being carried out by comparatively simple apparatus requiring less handling, less labor, construction and repair costs than the apparatus employed in prior methods.

It will be further apparent that while I have described the process and the plant layout therefor specifically showing the practice of the steps in the preferred form, I may make many changes and modifications both in the structure and in the steps of the process, all without departing from the spirit of the invention, defined in the following claims.

I claim:

1. The process of manufacturing an alkali mono-phosphate which consists in reacting an alkali-forming-metal salt reagent in comminuted form with dilute phosphoric acid, in directly thereafter evaporating the products of the reaction in a spray dryer producing the alkali mono-phosphate in dry powdered form, and in scrubbing the dust produced in the atomizing machine with a part of said dilute phosphoric acid.

2. The process of manufacturing an alkali phosphate which consists in reacting an alkali-forming-metal salt reagent with phosphoric acid, in evaporating the products of the reaction in a spray drying machine producing the alkali phosphate in dry powdered form, in conducting the dust produced in said spray drying machine through a scrubbing system, and in utilizing the product of said scrubbing system in a step of the process.

3. The process of manufacturing an alkali mono-phosphate which consists in reacting an alkali-forming-metal salt reagent in ground form with dilute phosphoric acid, in directly thereafter evaporating the products of the reaction in a spray drying machine producing the alkali mono-phosphate in dry powdered form, in conducting the dust produced in said spray drying machine through a scrubbing system through which part of said dilute acid is fed, and in utilizing the product of said scrubbing system in the first reacting step of the process.

4. The process of manufacturing an alkali phosphate which consists in reacting an alkali-forming-metal salt reagent with phosphoric acid, in evaporating the products of the reaction in a spray drying machine producing the alkali phosphate in dry powdered form, in conducting the dust produced in said spray drying machine through a scrubbing system through which an acid is fed, and in utilizing the product of said scrubbing system in the first reacting step of the process.

Signed at Charlotte, in the county of Mecklenburg and State of North Carolina, this 24 day of June, A. D. 1927.

INGENUIN HECHENBLEIKNER.